US012691966B2

(12) United States Patent
Chen

(10) Patent No.: US 12,691,966 B2
(45) Date of Patent: Jul. 28, 2026

(54) SCOOTER

(71) Applicant: Yongkang Jiayu Metal Products Co., Ltd, Jinhua (CN)

(72) Inventor: Jiangyong Chen, Jinhua (CN)

(73) Assignee: Yongkang Jiayu Metal Products Co., Ltd, Jinhua (CN)

( * ) Notice: Subject to any disclaimer, the term of this patent is extended or adjusted under 35 U.S.C. 154(b) by 275 days.

(21) Appl. No.: 18/592,345

(22) Filed: Feb. 29, 2024

(65) Prior Publication Data

US 2024/0294227 A1     Sep. 5, 2024

(30) Foreign Application Priority Data

Mar. 3, 2023     (CN) .......................... 202320380159.5

(51) Int. Cl.
B62K 3/02          (2006.01)
B62J 1/08          (2006.01)
B62K 3/00          (2006.01)

(52) U.S. Cl.
CPC ................. B62K 3/002 (2013.01); B62J 1/08 (2013.01)

(58) Field of Classification Search
CPC . B62K 3/002; B62K 3/02; B62K 3/10; B62K 9/00; B62K 15/00; B62J 1/08; B62J 1/28
See application file for complete search history.

(56) References Cited

U.S. PATENT DOCUMENTS

| | | | | | |
|---|---|---|---|---|---|
| 6,089,586 | A | * | 7/2000 | Rudell | ..................... B62K 9/02 |
| | | | | | 280/282 |
| 9,254,883 | B2 | * | 2/2016 | Berndorfer | ............ B62K 13/08 |
| 10,723,405 | B2 | * | 7/2020 | Kirchschlager | ...... B62K 15/006 |
| D908,808 | S | * | 1/2021 | Wang | ........................... D21/423 |

FOREIGN PATENT DOCUMENTS

| | | | | |
|---|---|---|---|---|
| CN | 215826901 U | * | 2/2022 | |
| CN | 217198494 U | * | 8/2022 | |
| CN | 218085862 U | * | 12/2022 | |

* cited by examiner

*Primary Examiner* — John D Walters

(57)          ABSTRACT

Disclosed is a scooter, including a seat unit, rotatably arranged on a main body of the scooter and including a first position as a seat after being unfolded and a second position as a handrail after being folded; and a locking unit, arranged on the main body of the scooter, the locking unit positioning the seat unit when the seat unit is in the first position and the second position. In the present disclosure, the seat unit matches with a handrail unit to provide a dual-purpose mode. The seat unit, when unfolded, serves as a seat, and the handrail unit serves as a handrail.

11 Claims, 8 Drawing Sheets

SCOOTER

CROSS-REFERENCE TO RELATED APPLICATIONS

This application claims priority of Chinese Patent Application No. 202320380159.5, filed on Mar. 3, 2023, the entire contents of which are incorporated herein by reference.

TECHNICAL FIELD

The present disclosure relates to the technical field of scooters, and in particular to a scooter.

BACKGROUND

A scooter for children is a common type of children's cart for children to play. A common scooter for children usually only includes a main body of the scooter and a handhold piece arranged on the main body of the scooter. With the development of the industry, the scooter for children is not limited to playing by children, as described in the Chinese disclosure patent document CN216783692U previously published. However, a seat of such a scooter can only be folded to one side of a handrail of the scooter, the folded seat still occupies more player's activity space, and the style is not aesthetically pleasing, so further improvements are made.

SUMMARY

Aiming at the shortcomings in the prior art, the present disclosure provides a scooter.

In order to solve the above technical problems, the present disclosure provides the following technical solutions.

A scooter includes:

a seat unit, rotatably arranged on a main body of the scooter and including a first position as a seat after being unfolded and a second position as a handrail after being folded; and a locking unit, arranged on the main body of the scooter, the locking unit positioning the seat unit when the seat unit is in the first position and the second position.

In the above technical solution, preferably, front and rear ends of the seat unit include mounting openings for mounting a handrail unit, the handrail unit being mounted at the mounting opening at the front end of the seat unit when the seat unit is in the first position; and the handrail unit being mounted at the mounting opening at the rear end of the seat unit when the seat unit is in the second position.

In the above technical solution, preferably, the locking unit includes a lock head movably arranged on the main body of the scooter, a first elastic unit is arranged between the lock head and the main body of the scooter, and the seat unit includes a cavity body for at least part of the lock head to enter, the seat unit being positioned when the lock head enters the cavity body.

In the above technical solution, preferably, the cavity body includes an upper cavity body, a lower cavity body and a plurality of holes; at least one of the holes is a through-penetration hole, and a lock pin is mounted at the through-penetration hole; and the lock pin is mounted on a cover body of the main body of the scooter after passing through the upper cavity body, and the lock pin includes a limiting head for limiting the seat unit.

In the above technical solution, preferably, the cover body includes a connecting column for mounting the lock pin, the lock head includes a perforation adapted to the connecting column, the seat unit is rotatably arranged on the connecting column, and the lock pin is mounted on the connecting column.

In the above technical solution, preferably, the upper cavity body is arranged with a pressing unit for matching with the lock head, a shape and size of the lock head being adapted to those of the lower cavity body.

In the above technical solution, preferably, the lock head includes outwardly convex or inwardly concave parts, and the lower cavity body includes corresponding inwardly concave or outwardly convex parts.

In the above technical solution, preferably, the pressing unit includes a plurality of outwardly extending pushing heads for matching with the lock head, the pushing heads being arranged at the corresponding holes.

In the above technical solution, preferably, the handrail unit includes a built-in cavity and a throughhole communicating with the built-in cavity; and a second elastic unit is arranged in the built-in cavity, the second elastic unit includes a pin head arranged at the through hole, and the pressing unit includes a raised head matching with the pin head.

In the above technical solution, preferably, the second elastic unit includes a first part and a second part formed by bending one end of the first part, one end of the second part abutting against an inner wall of the built-in cavity, and the pin head being arranged at one end of the second part.

The present disclosure has the following beneficial effects.

In the present disclosure, the seat unit matches with a handrail unit to provide a dual-purpose mode. The seat unit, when unfolded, serves as a seat, and the handrail unit serves as a handrail; and after being folded, the seat unit serves as a stand column, the handrail unit serves as a handle, and the two are combined to form an integral handrail of the scooter. The scooter has a simple structure, safety and reliability, a convenient switching mode, and a higher aesthetic degree.

DETAILED DESCRIPTION

The present disclosure will be further described in detail with the attached drawings and specific implementations.

Figure 7:
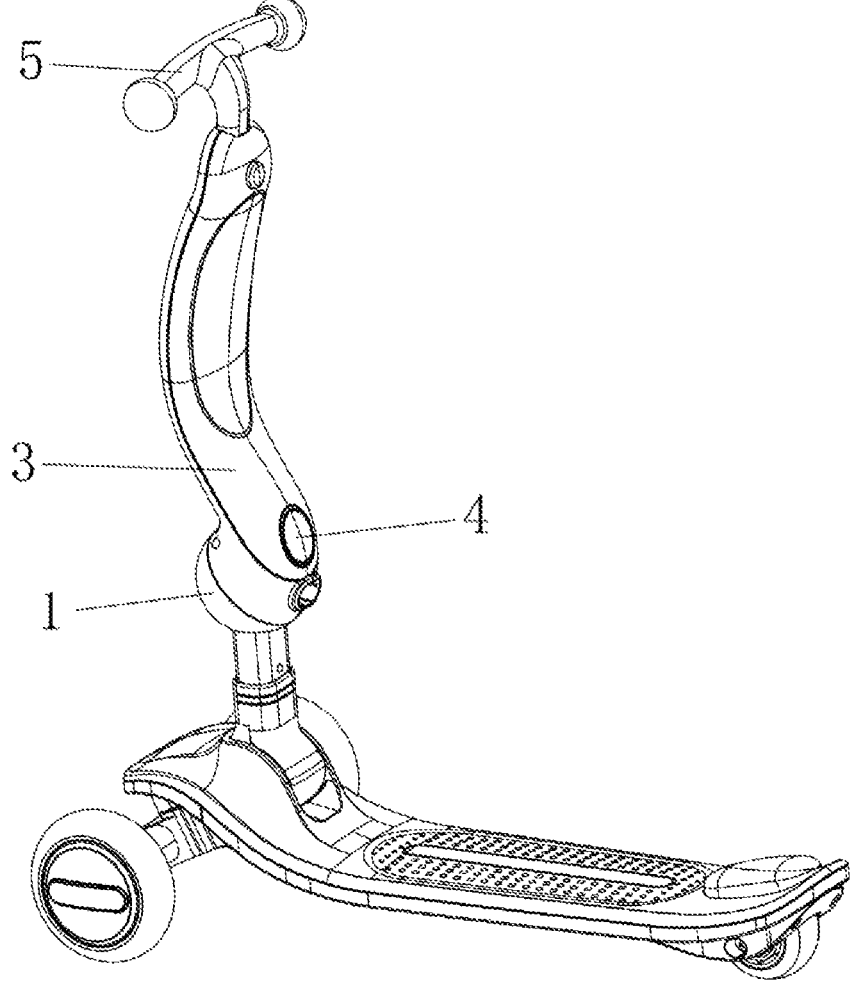
FIG. 7 is a schematic diagram of a second position of the present disclosure.
Figure 8:
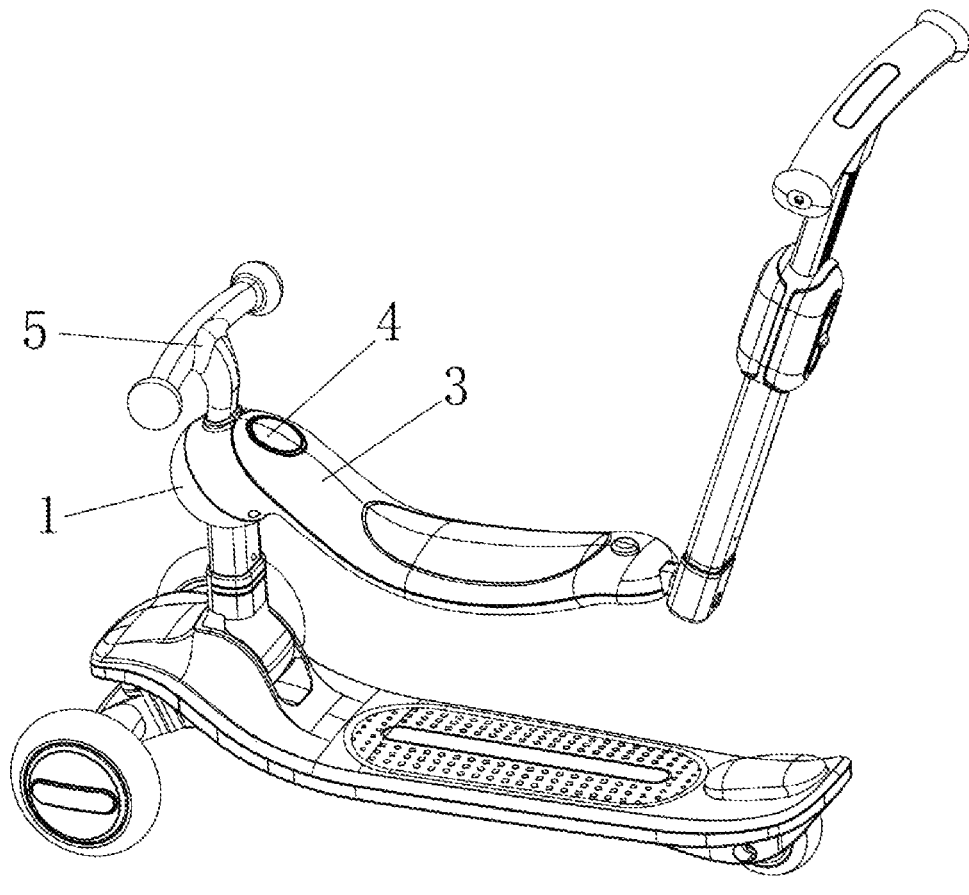
FIG. 8 is a schematic diagram of another form of the first position of the present disclosure.
Figure 9:
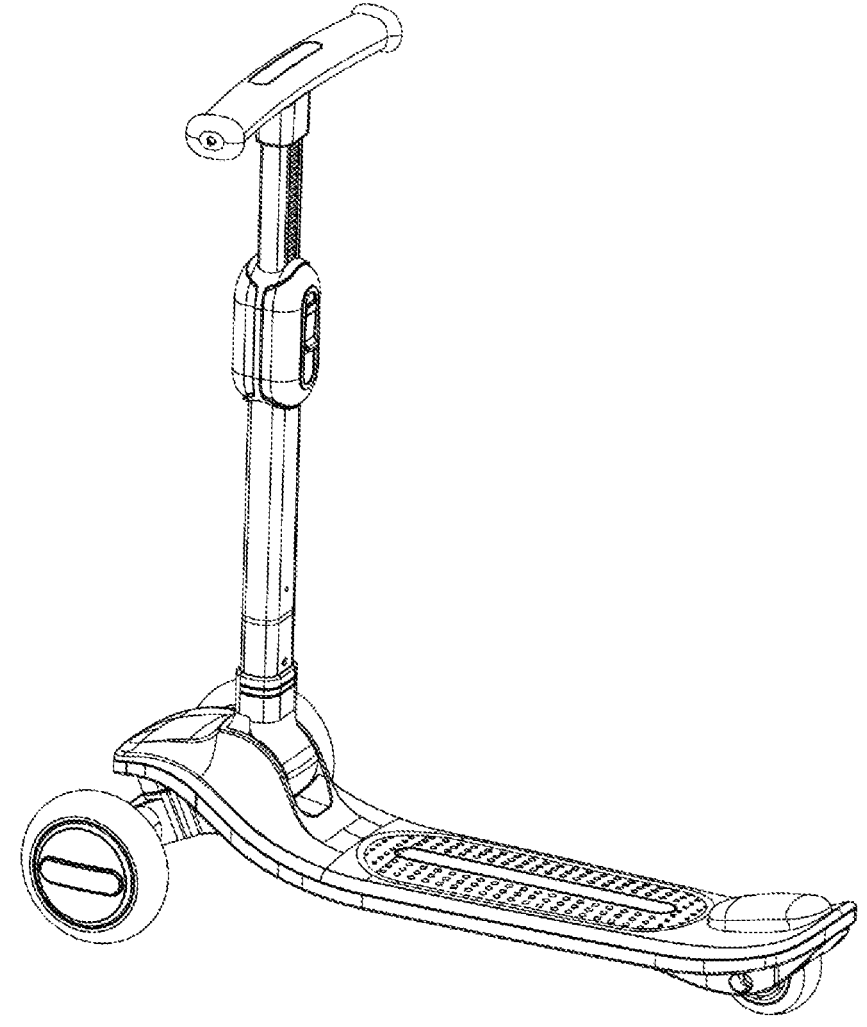
FIG. 9 is a schematic diagram of another state of the present disclosure.
Figure 10:
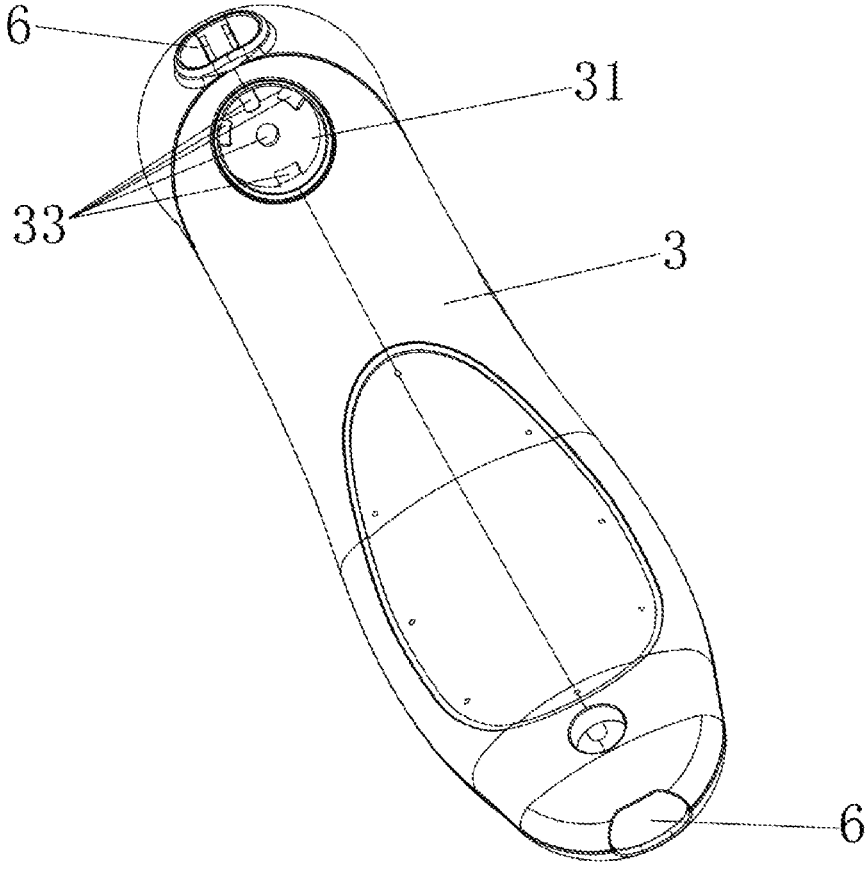
FIG. 10 is a schematic diagram of a seat unit of the present disclosure.
Figure 11:
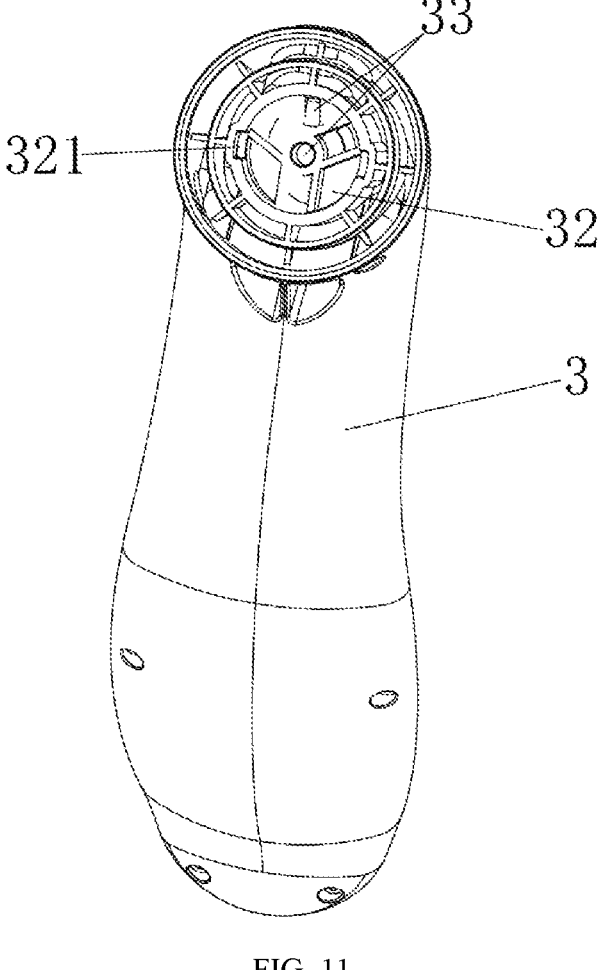
FIG. 11 is a schematic diagram of the seat unit of the present disclosure from another perspective.

Referring to FIGS. 1 to 11, a scooter includes a main body of the scooter, including a part for mounting a handrail, and a cover body 1 being mounted on the part. The cover body 1 is in a detachable form and a non-detachable form, and for the detachable form, after removal of the cover body 1 and associated components, the cover body 1 is used for mounting a handrail of a long bar type, as shown in FIG. 9.

Figure 2:
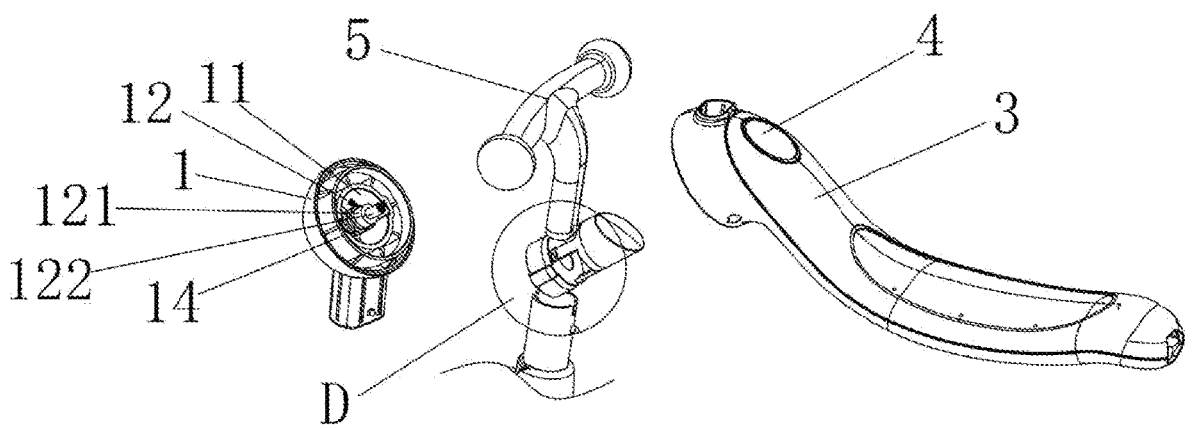
FIG. 2 is an exploded schematic diagram of a partial structure of the present disclosure.

In the example, the cover body 1 includes a receiving cavity body 11 and a connecting column 12, as shown in FIG. 2. The connecting column 12 is located at a middle position of the receiving cavity body 11. In the example, the connecting column 12 includes a main column 121 for matching with a lock head 2, and an extension column 122 for matching with a seat unit 3 and a lock pin 13, which are described in detail below.

Alternatively, the extension column 122 has a built-in threaded cavity, and the lock pin 13 is a bolt threadedly matched with the built-in threaded cavity.

Figure 5:
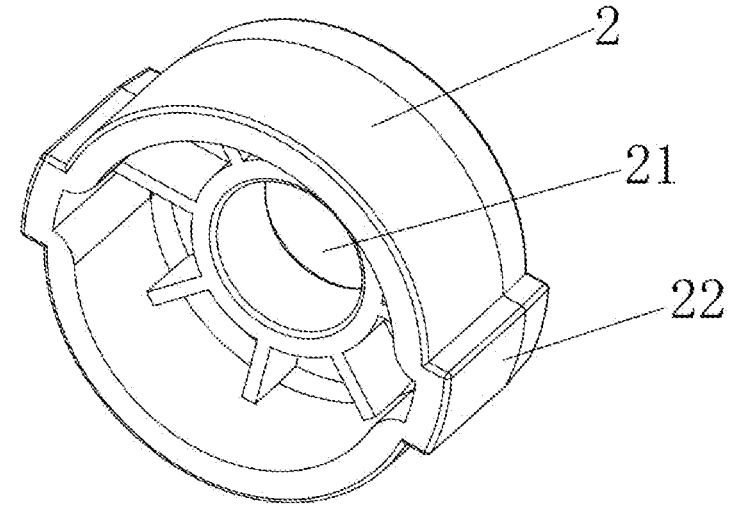
FIG. 5 is a schematic diagram of a lock head of the present disclosure.

The receiving cavity body 11 is used for mounting the lock head 2, a first elastic unit 14 is arranged between the lock head 2 and an inner wall of the receiving cavity body 11, and the first elastic unit 14, a spring, is sleeved on the connecting column 12. As shown in FIG. 5, the lock head 2 includes a perforation 21 through which the connecting column 12 passes, and outwardly convex or inwardly concave parts 22. A shape and size of the perforation 21 can conform to those of the main column 121 of the connecting column 12, for example, the perforation 21 is a circular hole, and the main column 121 is a cylinder.

The seat unit 3 is rotatably mounted at the cover body 1. In the example, a cavity body is disposed on the seat unit 3, the cavity body including an upper cavity body 31, a lower cavity body 32 and a plurality of holes 33. At least two or more holes 33 are communicated with the upper cavity body 31 and the lower cavity body 32, and the hole located at a middle position is a through-penetration hole in communication with the upper cavity body 31 and the lower cavity body 32, and is used for the extension column 122 or the lock pin 13 to pass through. Specifically, the extension column 122 enters from the lower cavity body 32 and is mounted at the corresponding hole 33, and the hole 33 is disposed on a partition-type component between the upper cavity body 31 and the lower cavity body 32; and the extension column 122 matches with the corresponding hole 33, so that the seat unit 3 can rotate along the extension column 122.

Further, the lock pin 13 includes a limiting head 131 having an outer diameter larger than that of a corresponding perforation, and a spacer can be disposed between walls of the limiting head 131 and the partition-type component to limit the seat unit 3.

In the example, the first elastic unit is used for pushing the lock head 2 in a direction of the seat unit 3, and in the absence of external force, at least part of the lock head 2 is located in the lower cavity body 32, and the lower cavity body 32 has outwardly convex or inwardly concave parts 321 adapted to the outwardly convex or inwardly concave parts 22 on the lock head 2, in this way, the two can achieve a clamping limit fit. When the lock head 2 has the outwardly convex parts, the lower cavity body 32 has the inwardly concave parts; and when the lock head 2 has the inwardly concave parts, the lower cavity body 32 has the outwardly convex parts to lock the seat unit.

Figure 6:
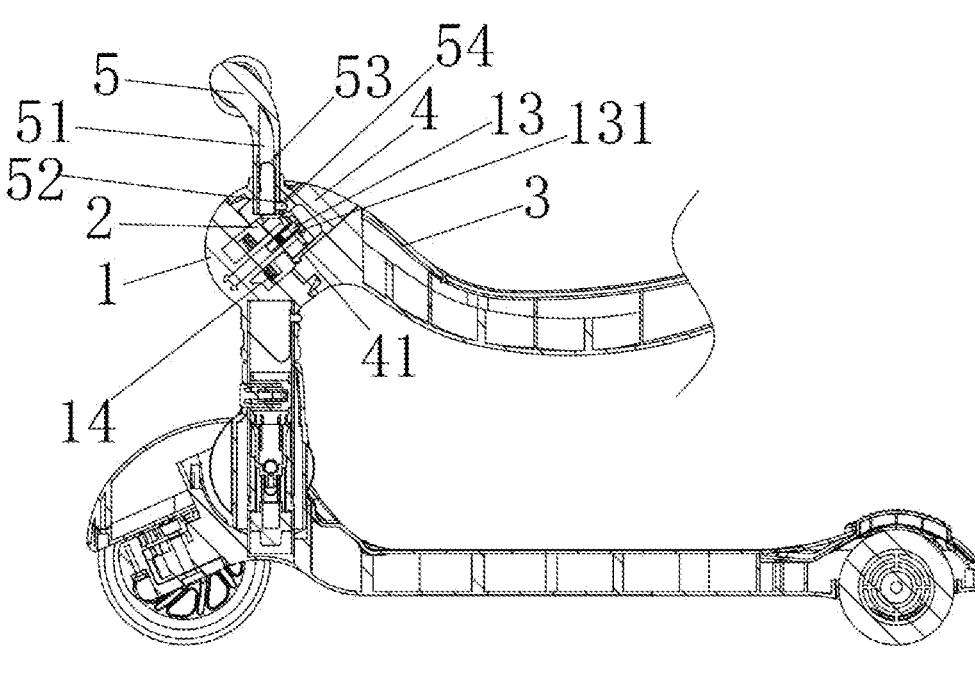
FIG. 6 is a schematic sectional diagram of the present disclosure.

In order to realize the unlocking of the lock head 2, in the example, a pressing unit 4 corresponding to the lock head 2 is arranged on the seat unit 3. As shown in FIG. 5, the pressing unit 4 includes a plurality of outwardly extending pushing heads 41. In one of the implementations, three pushing heads 41 are arranged, and the cavity body includes three holes 33 correspondingly, and the hole 33 is also the through-penetration hole communicating with the upper cavity body 31 and the lower cavity body 32. After assembly, as shown in FIG. 6, the first elastic unit contracts by pressing the pressing unit 4 to push the lock head 2 to move towards the cover body 1; and the pushing heads 41 do not interfere, so that the unlocking of the seat unit 3 is realized, and the seat unit 3 can rotate in a set direction after unlocking.

In the example, front and rear ends of the seat unit 3 include mounting openings 6 for mounting a handrail unit 5. The handrail unit 5 is mounted at different positions corresponding to different use states of the scooter.

Figure 1:
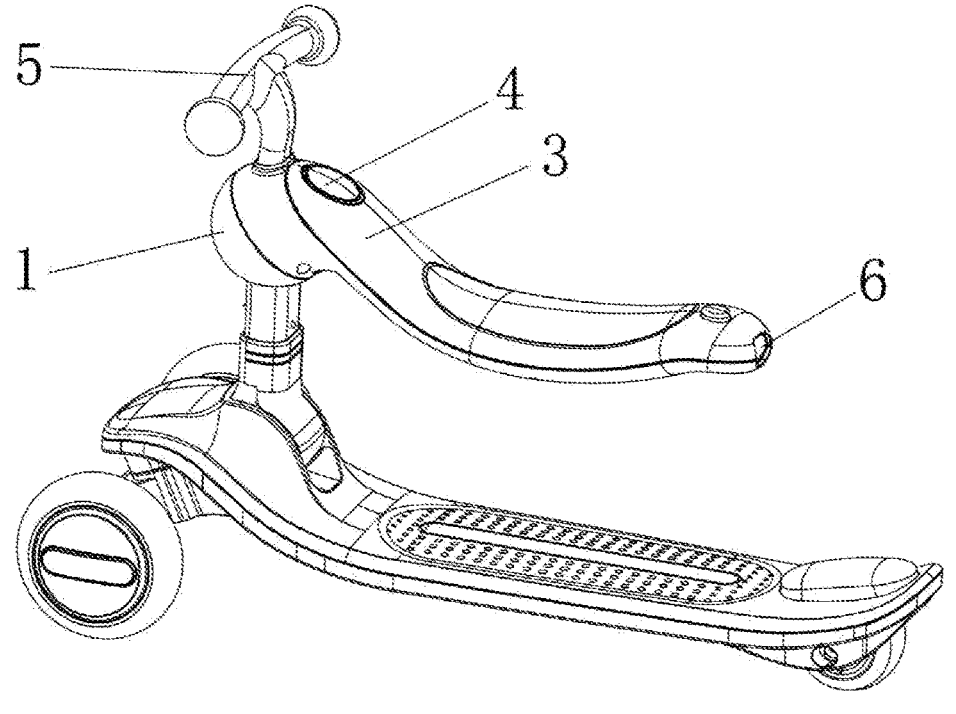
FIG. 1 is a schematic diagram of a first position of the present disclosure.

Firstly, as shown in FIG. 1, the handrail unit 5 is mounted at the mounting opening 6 at the front end of the seat unit 3, this position being a first position of the seat unit 3, so that a child can sit on the seat unit to play. In this state, another handrail can be inserted at the rear of the seat unit to serve as a push rod or backrest, as shown in FIG. 8.

Secondly, as shown in FIG. 7, the handrail unit 5 is mounted at the mounting opening 6 at the rear end of the seat unit 3, and at the same time, the seat unit 3 is turned over and folded, this position being a second position of the seat unit 3, and the seat unit 3 serves as an extension stand column part of the handrail unit, so that a child can stand on a pedal of the main body of the scooter to play.

Thirdly, the cover body 1, the seat unit 3, and a shorter handrail unit 5 are removed, and a longer handrail is replaced with, as shown in FIG. 9.

Figures 3, 4:
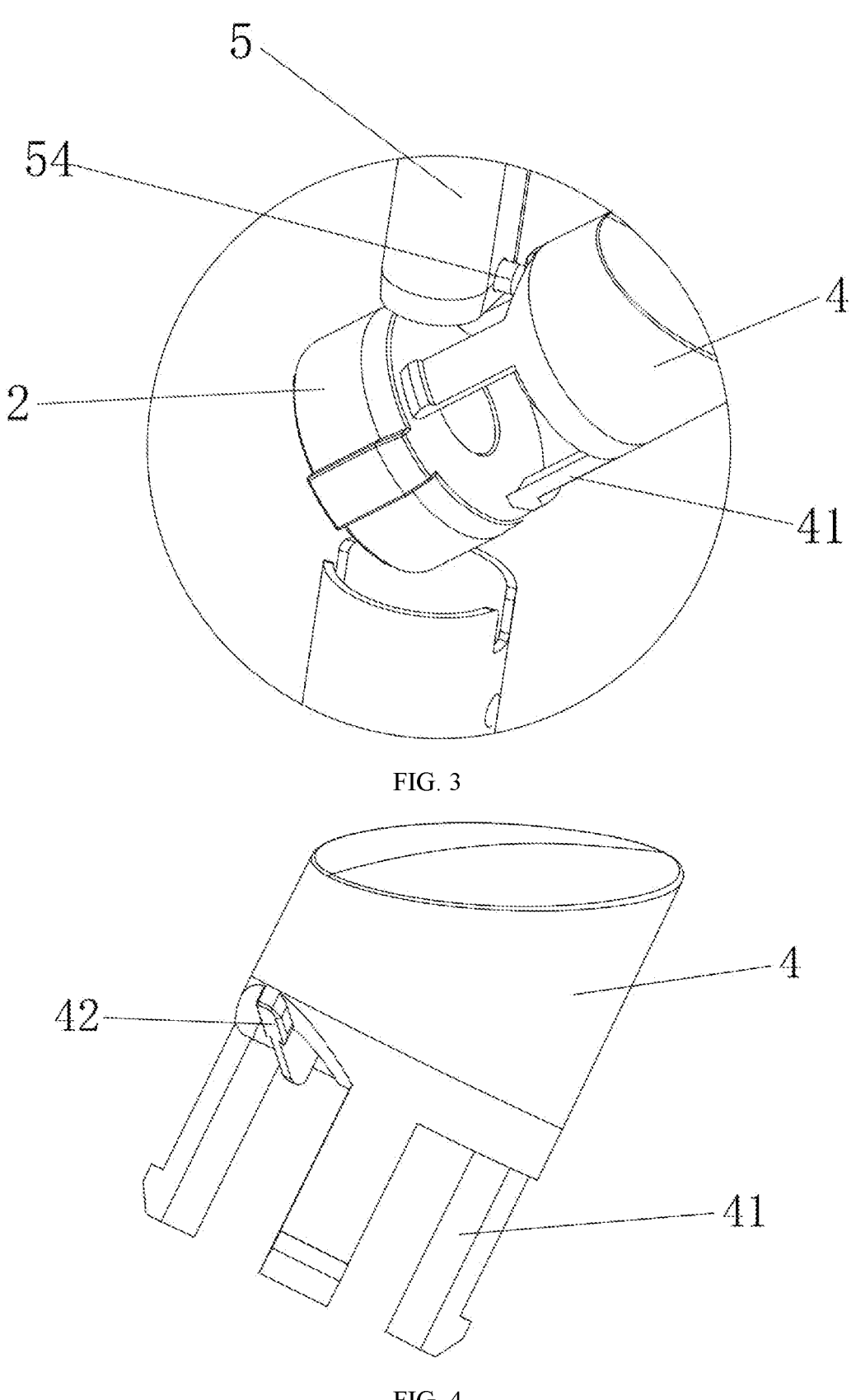
FIG. 3 is an enlarged schematic diagram at D in FIG. 2.
FIG. 4 is a schematic diagram of a pressing unit of the present disclosure.

However, in order to facilitate the assembly and disassembly of the handrail unit 5, in the example, the handrail unit 5 includes a built-in cavity 51 and a through hole 52 communicating with the built-in cavity 51. A second elastic unit 53 is arranged in the built-in cavity 51; the second elastic unit 53 includes a pin head 54 arranged at the through hole; and the pressing unit 4 includes a raised head 42 matching with the pin head 54. As shown in FIGS. 4 and 6, after the pressing unit 4 is pressed, the unlocking of the seat unit 3 and the unlocking of the handrail unit 5 can be realized synchronously.

In the example, the second elastic unit 53 includes a first part and a second part formed by bending one end of the first part, one end of the second part abutting against an inner wall of the built-in cavity, and the pin head 54 being arranged at one end of the second part.

The invention claimed is:

1. A scooter, comprising:
   a seat unit, rotatably arranged on a main body of the scooter and comprising a first position as a seat after being unfolded and a second position as a handrail after being folded; and
   a locking unit, arranged on the main body of the scooter, the locking unit positioning the seat unit when the seat unit is in the first position and the second position;
   wherein the locking unit comprises a lock head movably arranged on the main body of the scooter, a first elastic unit is arranged between the lock head and the main body of the scooter, and the seat unit comprises a cavity body for at least part of the lock head to enter, the seat unit being positioned when the lock head enters the cavity body;

wherein the cavity body comprises an upper cavity body, a lower cavity body and a plurality of holes; at least one of the holes is a through-penetration hole, and a lock pin is mounted at the through-penetration hole; and the lock pin is mounted on a cover body of the main body of the scooter after passing through the upper cavity body, and the lock pin comprises a limiting head for limiting the seat unit.

2. The scooter according to claim 1, wherein front and rear ends of the seat unit comprise mounting openings for mounting a handrail unit, the handrail unit being mounted at the mounting opening at the front end of the seat unit when the seat unit is in the first position; and the handrail unit being mounted at the mounting opening at the rear end of the seat unit when the seat unit is in the second position.

3. The scooter according to claim 1, wherein the cover body comprises a connecting column for mounting the lock pin, the lock head comprises a perforation adapted to the connecting column, the seat unit is rotatably arranged on the connecting column, and the lock pin is mounted on the connecting column.

4. The scooter according to claim 3, wherein the upper cavity body is arranged with a pressing unit for matching with the lock head, a shape and size of the lock head being adapted to those of the lower cavity body.

5. The scooter according to claim 4, wherein the pressing unit comprises a plurality of outwardly extending pushing heads for matching with the lock head, the pushing heads being arranged at the corresponding holes.

6. The scooter according to claim 5, wherein the second elastic unit comprises a first part and a second part formed by bending one end of the first part, one end of the second part abutting against an inner wall of the built-in cavity, and the pin head being arranged at one end of the second part.

7. The scooter according to claim 1, wherein the upper cavity body is arranged with a pressing unit for matching with the lock head, a shape and size of the lock head being adapted to those of the lower cavity body.

8. The scooter according to claim 7, wherein the pressing unit comprises a plurality of outwardly extending pushing heads for matching with the lock head, the pushing heads being arranged at the corresponding holes.

9. The scooter according to claim 8, wherein the second elastic unit comprises a first part and a second part formed by bending one end of the first part, one end of the second part abutting against an inner wall of the built-in cavity, and the pin head being arranged at one end of the second part.

10. The scooter according to claim 1, wherein the lock head comprises outwardly convex or inwardly concave parts, and the lower cavity body comprises corresponding inwardly concave or outwardly convex parts.

11. The scooter according to claim 1, wherein the handrail unit comprises a built-in cavity and a through hole communicating with the built-in cavity; and a second elastic unit is arranged in the built-in cavity, the second elastic unit comprises a pin head arranged at the through hole, and the pressing unit comprises a raised head matching with the pin head.

* * * * *